United States Patent
Jamshidi et al.

(10) Patent No.: US 9,402,218 B1
(45) Date of Patent: Jul. 26, 2016

(54) PRIORITIZATION OF NETWORK HANDOVERS

(71) Applicant: Sprint Communications Company L.P., Overland Park, KS (US)

(72) Inventors: Talat Jamshidi, Leawood, KS (US); Saravana Kumar Velusamy, Olathe, KS (US); Rajat Kumar, Kansas City, MO (US); Suryanarayanan Ramamurthy, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 158 days.

(21) Appl. No.: 14/149,495

(22) Filed: Jan. 7, 2014

(51) Int. Cl.
 *H04W 4/00* (2009.01)
 *H04W 36/24* (2009.01)

(52) U.S. Cl.
 CPC .................................. *H04W 36/24* (2013.01)

(58) Field of Classification Search
 USPC .......... 370/328, 331; 455/436, 437, 438, 439, 455/442, 443, 444
 See application file for complete search history.

(56) References Cited

U.S. PATENT DOCUMENTS

| | | | |
|---|---|---|---|
| 2005/0272428 A1* | 12/2005 | Tanabe et al. | 455/439 |
| 2010/0323704 A1* | 12/2010 | Tailor | H04W 36/32 455/438 |
| 2011/0176536 A1* | 7/2011 | De Franca Lima et al. | 370/352 |
| 2012/0115489 A1* | 5/2012 | Shuai | H04W 36/14 455/438 |
| 2013/0150052 A1* | 6/2013 | Zisimopoulos et al. | 455/437 |
| 2013/0170347 A1* | 7/2013 | Zhang et al. | 370/230 |
| 2013/0189987 A1* | 7/2013 | Klingenbrunn et al. | 455/436 |
| 2013/0195009 A1* | 8/2013 | Ramle et al. | 370/328 |
| 2013/0250032 A1* | 9/2013 | Andre-Jonsson et al. | 348/14.02 |
| 2013/0250916 A1* | 9/2013 | Aoyagi et al. | 370/331 |
| 2014/0112169 A1* | 4/2014 | Zhou et al. | 370/252 |
| 2015/0110069 A1* | 4/2015 | Keller et al. | 370/331 |

* cited by examiner

*Primary Examiner* — Kwang B Yao
*Assistant Examiner* — Nguyen Ngo

(57) ABSTRACT

Systems, methods, and computer-readable media for prioritizing a handover from an LTE network to a legacy network are provided. The method includes receiving, at a management component, a message from a mobile device. The message communicates a capability type associated with the mobile device. Based, in part, on this capability type, the management component assigns a priority to the mobile device. According to the assigned priority, the management component prioritizes the handover of the mobile device from the LTE network to the legacy network. This method reduces the latency for network handovers of mobile devices that are assigned a high priority.

20 Claims, 7 Drawing Sheets

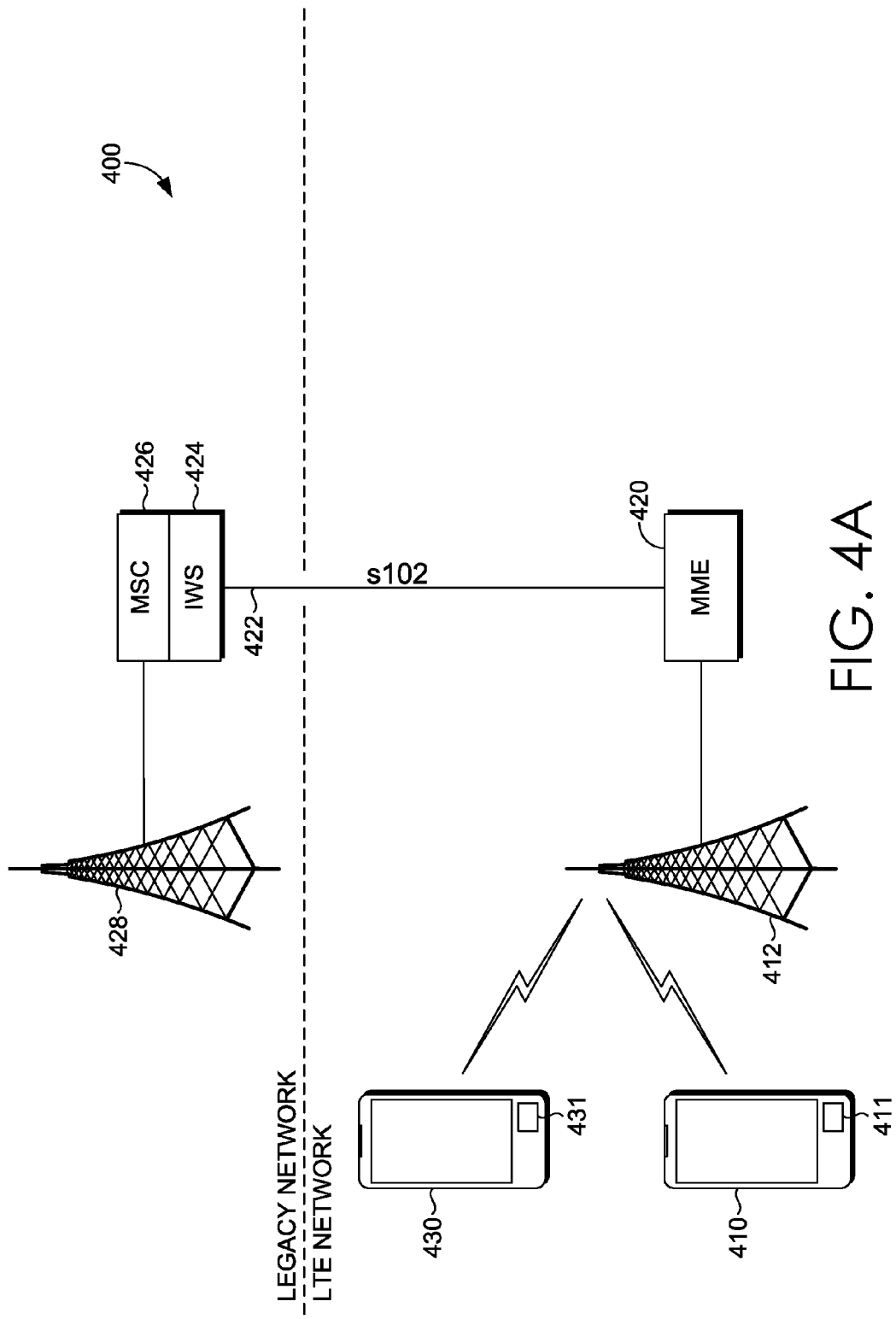

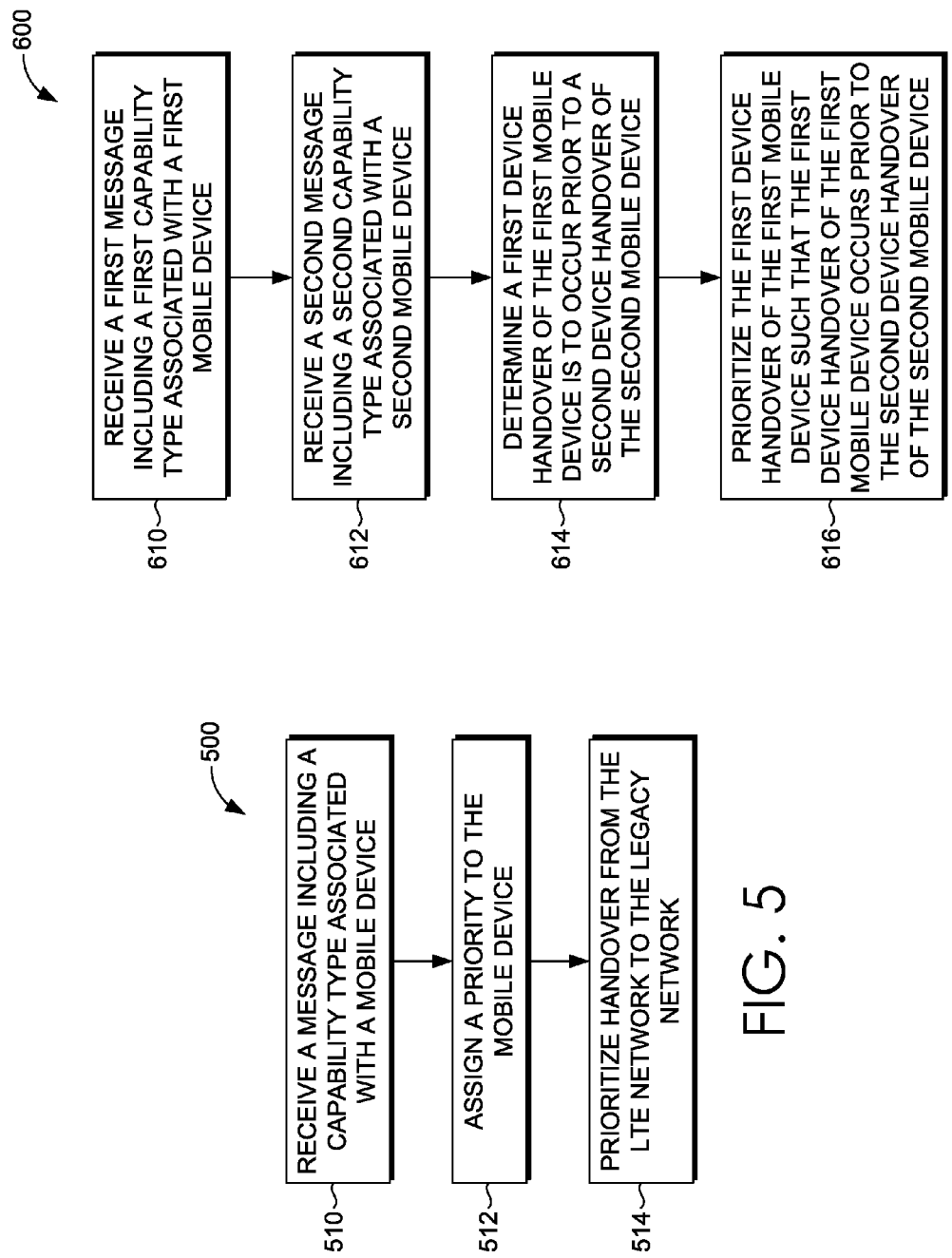

| PRIORITY | CAPABILITY TYPE |
|---|---|
| 1 | SRVCC |
| 2 | CSFB |
| 3 | LEGACY |

PRIORITIZATION OF NETWORK HANDOVERS

SUMMARY

In brief, and at a high level, this disclosure describes, among other things, prioritizing the handover of mobile devices among different networks. A priority is assigned to a mobile device based, in part, on the capability type associated with the mobile device, and the handover of that mobile device may then be prioritized according to the assigned priority. This reduces the latency for network handovers of mobile devices that are assigned a high priority.

This summary is provided to introduce a selection of concepts in a simplified form that are further described in the detailed description below. This summary is not intended to identify key features or essential features of the claimed subject matter, nor is it intended to be used as an aid in determining the scope of the claimed subject matter.

BRIEF DESCRIPTION OF THE DRAWINGS

Illustrative embodiments of the present invention are described in detail below with reference to the attached drawing figures, which are incorporated by reference herein, and wherein:

FIG. 4A is a schematic view of an exemplary scenario in which embodiments of the present invention may be implemented;

FIG. 5 provides a first exemplary method for prioritizing network handovers in accordance with an embodiment of the present invention;

FIG. 6 provides a second exemplary method for prioritizing network handovers in accordance with an embodiment of the present invention; and FIG. 7 provides an exemplary prioritization scheme in accordance with an embodiment of the present invention.

DETAILED DESCRIPTION

Figure 1:
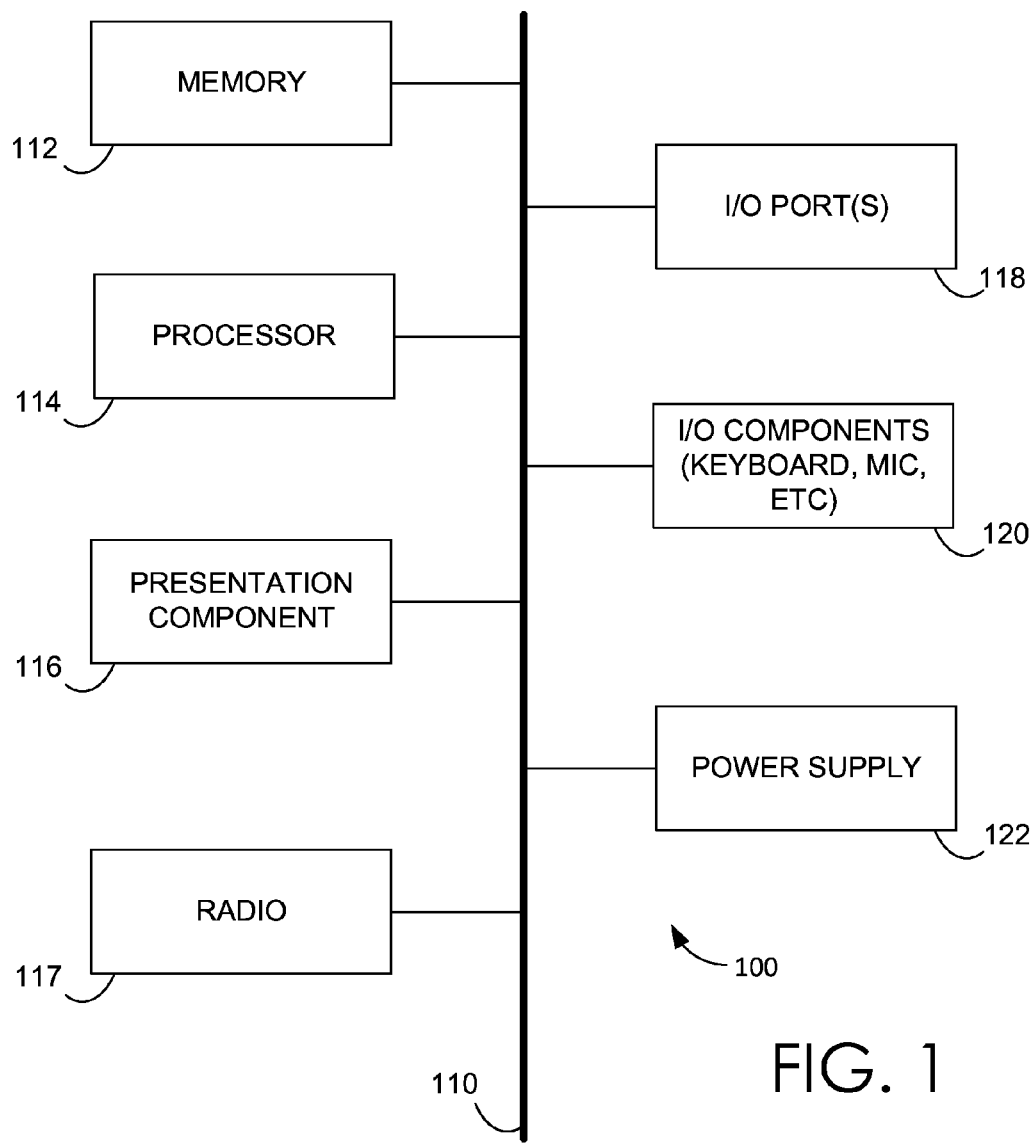
FIG. 1 depicts an exemplary computing device according to embodiments of the present invention.

The subject matter of the present invention is described with specificity herein to meet statutory requirements. However, this description is not intended to limit the scope of this patent. Rather, it is contemplated that the claimed subject matter might also be embodied in other ways, to include different steps or combinations of steps similar to the ones described in this document, in conjunction with other present or future technologies. Moreover, although the terms "step" and "block" might be used herein to connote different elements of the methods employed, the terms should not be interpreted as implying any particular order among or between various steps herein disclosed unless and except when the order of individual steps is explicitly described.

Embodiments of the present invention relate to systems, methods, and computer-readable media for, among other things, prioritizing network handovers. Utilizing embodiments hereof, a priority may be assigned to a mobile device based, in part, on the capability type associated with the mobile device, and the handover of that mobile device may then be prioritized according to the assigned priority. This reduces the latency for network handovers of mobile devices that are assigned a high priority.

For example, two mobile devices within an LTE network coverage area may be associated with two different capability types. The first mobile device may be associated with a CSFB capability type. This mobile device can utilize data services on the LTE network, but is handed over to a legacy network for voice services. The latency for the handover of this first mobile device affects the time required to make or receive a voice call at the device. A small increase in the time required to perform these functions has a less significant impact on the quality of user experience than does the latency for a network handover of devices associated with other capability types. The second mobile device, for example, may be a VoLTE device associated with an SRVCC capability type. This VoLTE device can utilize voice services on the LTE network, and thus may be engaged in a voice call on the LTE network at the time the mobile device is to be handed over from the LTE network to the legacy network. When the second device is handed over, it utilizes SRVCC technology to seamlessly transfer the voice call from the LTE network to the legacy network. However, if the time required to handover the second mobile device increases, the ongoing call may be dropped. Thus, the latency for the handover of the second device associated with an SRVCC capability type has a more significant impact on the quality of user experience than does the latency for the handover of the first mobile device associated with a CSFB capability type.

The present invention enables a higher priority to be assigned to the device associated with an SRVCC capability type and a lower priority to be assigned to the device associated with a CSFB capability type. Then, if the LTE network receives multiple indications, all received at about the same time, that both devices are to be handed over, the handovers may be prioritized according to the priorities assigned to each device. In this way, the latency for the handover of the second mobile device associated with an SRVCC capability type may be minimized, thereby ensuring a high quality of user experience.

Accordingly, in one aspect, the present invention is directed to a method for prioritizing a handover from an LTE network to a legacy network. The method includes, at a management component, receiving a message from a mobile device capable of communicating with the LTE network. The message from the mobile device includes a capability type associated with the mobile device. The method further includes assigning a priority to the mobile device based on prioritization logic and the capability type associated with the mobile device. Also, the method includes prioritizing the handover from the LTE network to the legacy network according to the priority assigned to the mobile device.

In another aspect, the present invention is directed to computer-readable media having computer-executable instructions embodied thereon that, when executed, perform a method for prioritizing a handover from an LTE network to a legacy network. The method includes, at a management component, receiving a first message from a first mobile device. The first message includes a first capability type associated with the first mobile device. Further, the method includes receiving a second message from a second mobile device. The second message includes a second capability type associated with the second mobile device. The method also includes utilizing prioritization logic, the first capability type, and the second capability type to determine that a first device handover of the first mobile device from the LTE network to the legacy network is to occur prior to a second device handover of the second mobile device from the LTE network to the legacy network. Furthermore, the system includes prioritizing the first device handover of the first mobile device such that the first device handover of the first mobile device occurs prior to the second device handover of the second mobile device.

In yet another aspect, a system for prioritizing a handover from an LTE network to a legacy network is provided. The system includes a first mobile device capable of communicating with the LTE network. The first mobile device includes logic that enables the first mobile device to send a message including a capability type associated with the first mobile device. The system also includes a management component that receives the message including the capability type associated with the first mobile device. The management component further assigns a priority to the first mobile device based on prioritization logic and the capability type associated with the first mobile device. Also, the management component prioritizes the handover from the LTE network to the legacy network according to the priority assigned to the first mobile device.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

BTS Base Transceiver Station
3G Third Generation Mobile Telecommunications
4G Fourth Generation Mobile Telecommunications
CD-ROM Compact Disk Read Only Memory
CDMA Code Division Multiple Access
GPRS General Packet Radio Service
GSM Global System for Mobile communications: originally from Groupe Spécial Mobile
DVD Digital Versatile Discs
EEPROM Electrically Erasable Programmable Read Only Memory
eNodeB Evolved Node B
HLR Home Location Register
HSDPA High-Speed Downlink Packet Access
LTE Long Term Evolution
PC Personal Computer
PDA Personal Digital Assistant
RAM Random Access Memory
ROM Read Only Memory
TDMA Time Division Multiple Access
UMTS Universal Mobile Telecommunications System
VOIP Voice Over Internet Protocol
WiMAX Worldwide Interoperability for Microwave Access Further, various technical terms are used throughout this description. An illustrative resource that fleshes out various aspects of these terms can be found in Newton's Telecom Dictionary, 25th Edition (2009).

Embodiments of the present technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Referring to the drawings, in general, and initially to FIG. 1, in particular, a block diagram of an illustrative communications device according to one embodiment is provided and referenced generally by the numeral 100. Although some components are shown in the singular, they may be plural. For example, communications device 100 might include multiple processors or multiple radios, etc. As illustratively shown, communications device 100 includes a bus 110 that directly or indirectly couples various components together including memory 112, a processor 114, a presentation component 116, a radio 117 (if applicable), input/output ports 118, input/output components 120, and a power supply 122.

Memory 112 might take the form of memory components previously described. Thus, further elaboration will not be provided here, only to say that memory 112 can include any type of medium that is capable of storing information (e.g., a database). A database can be any collection of records. In one embodiment, memory 112 includes a set of embodied computer-executable instructions that, when executed, facilitate various aspects disclosed herein. These embodied instructions will variously be referred to as "instructions" or an "application" for short.

Processor 114 might actually be multiple processors that receive instructions and process them accordingly. Presentation component 116 includes the likes of a display, a speaker, as well as other components that can present information (such as a lamp (LED), or even lighted keyboards).

Numeral 117 represents a radio(s) that facilitates communication with a wireless-telecommunications network. Illustrative wireless telecommunications technologies include CDMA, GPRS, TDMA, GSM, and the like. Radio 117 might additionally or alternatively facilitate other types of wireless communications including Wi-Fi, WiMAX, LTE, or other VoIP communications. As can be appreciated, in various embodiments, radio 117 can be configured to support multiple technologies, and multiple radios can be utilized to support multiple technologies.

Input/output port 118 might take on a variety of forms. Illustrative input/output ports include a USB jack, stereo jack, infrared port, proprietary communications ports, and the like. Input/output components 120 include items such as keyboards, microphones, speakers, touch screens, and any other item usable to directly or indirectly input data into communications device 100. Power supply 122 includes items such as batteries, fuel cells, or any other component that can act as a power source to power communications device 100.

As previously mentioned, embodiments of the present invention provide systems, methods, and computer-readable media for prioritizing network handovers. Accordingly, a priority may be assigned to a mobile device based, in part, on the capability type associated with the mobile device, and the handover of that mobile device may then be prioritized according to the assigned priority. In this way, the latency for network handovers of mobile devices that are assigned a high priority may be reduced. This approach is in contrast to a network receiving multiple indications that multiple devices are to be handed over, and then simply processing the handovers in the order in which the indications were received.

Figure 2:
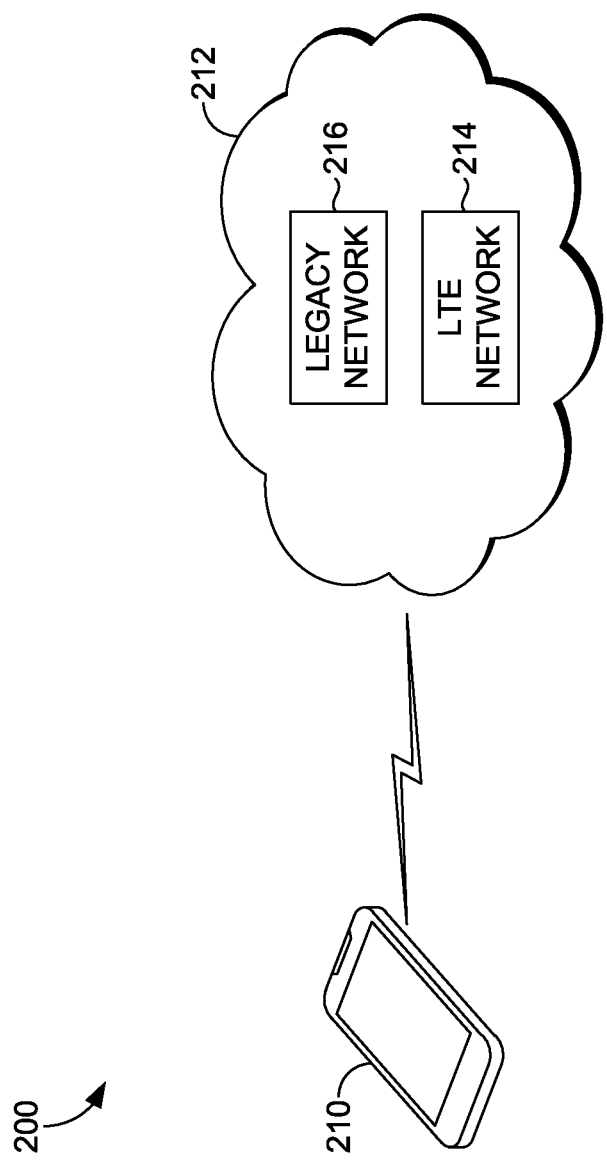
FIG. 2 is a schematic view of an exemplary network environment suitable for use in implementing embodiments of the present invention.

FIG. 2 provides an exemplary environment suitable for use in implementing embodiments of the present invention. Such an environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

In the network environment 200, a mobile device 210 is communicatively coupled to one or more components of one or more networks. In the illustration, the mobile device 210 communicates with various components utilizing a network 212. The mobile device 210 can utilize network 212 to communicate with other components (e.g., a server(s), a personal computer(s), a BTS). In embodiments, the network is a telecommunications network(s), or a portion thereof. A telecommunications network might include an array of devices or components, some of which are not shown so as to not obscure more relevant aspects of the invention. Components such as terminals, links, and nodes (as well as other components) can provide connectivity in some embodiments. The network can include multiple networks, as well as being a network of networks, but is shown in a more simple form so as to not obscure other aspects of the present invention. In embodiments, the network can be associated with a telecommunications provider that provides services to mobile devices. The network can be any communication network providing voice and/or data service(s), such as, for example, a 1× circuit voice, a 3G network (e.g., CDMA, CDMA2000, WCDMA, GSM, UMTS), or a 4G network (e.g., WiMAX, LTE, HSDPA, LTE Advanced).

As briefly mentioned above, the network 212 may include multiple networks. FIG. 2 illustrates that network 212 includes an LTE network 214 and a legacy network 216. In one embodiment, the legacy network 216 is a 3G network. In another embodiment, the legacy network 216 is 1× circuit voice.

The mobile device 210 is configured to, among other things, communicate with one or more other components of network 212, such as the LTE network 214 or the components thereof. At a high level, when the mobile device 210 is connected to either the LTE network 214 or the legacy network 216, a signal is associated with the connection. Often times, when a signal is fading, mobile devices may be transferred among networks. A signal may fade as a result of mobile device 210 moving out of the coverage area of either LTE network 214 or legacy network 216. In an embodiment, the mobile device 210 is transferred from the LTE network 214 to the legacy network 216. This transfer, or handover, may occur upon identifying a signal is fading. Such fading may result from mobile device 210 moving out of the coverage area of LTE network 214. For instance, assuming the mobile device 210 is in the LTE network 214, the LTE network 214, or a component thereof, may identify that the signal of the mobile device 210 is fading. The eNodeB, which is a hardware component in an LTE network that communicates with mobile devices, may be the component of the LTE network 214 that identifies that the signal is fading or decreasing. As explained below, mobile device 210 may also be transferred among networks for reasons other than a signal fading.

Mobile device 210 may be associated with one of a variety of capability types. The capability type relates to the services in which the mobile device 210 can engage on the LTE network 214, as well as the importance of the latency for a network handover of the mobile device 210 for various services, such as, for example, voice services. In one embodiment, mobile device 210 is associated with a Circuit Switched Fall Back (CSFB) capability type. CSFB is a technology that allows a mobile device in the coverage area of LTE network 214, which is a packet-based network that cannot support circuit-switched services, to "fall back" to legacy network 216, which does support, for example circuit-switched voice services. Thus, in this embodiment, mobile device 210 can utilize data services on the LTE network 214, but falls back to the legacy network 216 for voice and other circuit-switched services. When mobile device 210 is in the coverage area of LTE network 214, and mobile device 210 either makes or receives a voice call, mobile device 210 is handed over to the legacy network 216 for voice services. The latency for the network handover in this embodiment affects the time required to make or receive a voice call. A small increase in the time required to perform these functions has a less significant impact on the quality of user experience, as compared to the impact that the latency for a network handover has in other situations discussed below.

In another embodiment, mobile device 210 is a Voice over LTE (VoLTE) device, which can utilize both data and voice services on the LTE network. In this embodiment, mobile device 210 is associated with a Single Radio Voice Call Continuity (SRVCC) capability type. SRVCC technology provides seamless voice call continuity when a mobile device is handed over from LTE network 214 to legacy network 216. Thus, in this embodiment, when mobile device 210 is engaged in a voice call on LTE network 214 and mobile device 210 moves out of the coverage area of LTE network 214, then mobile device 210 is handed over to legacy network 216, and the voice call is seamlessly transferred from LTE network 214 to legacy network 216. The latency for the handover in this embodiment has a more significant impact on user experience than does the latency for the handover of a device associated with a CSFB capability type, as discussed above, because in this embodiment, an increase in the time required to handover mobile device 210 from LTE network 214 to legacy network 216 may result in a dropped voice call. In some embodiments, the handover is to be completed within about 200 milliseconds to about 250 milliseconds to avoid dropping the call that is in progress.

Figure 3:
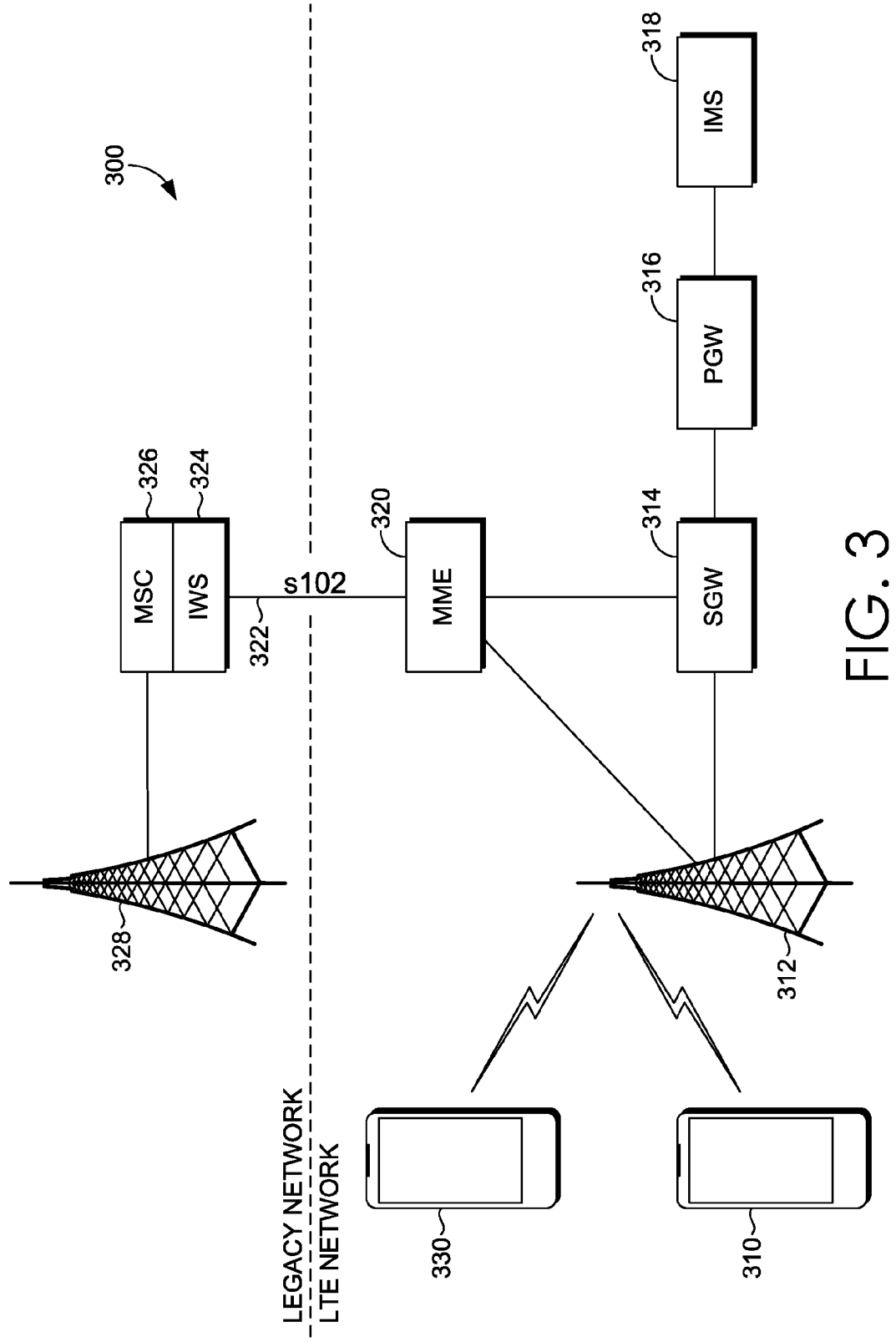
FIG. 3 is a schematic view of an exemplary network environment suitable for use in implementing embodiments of the present invention.

Turning now to FIG. 3, a more detailed schematic view of an exemplary network environment suitable for use in implementing embodiments of the present invention is illustrated as network environment 300. While FIG. 2 provides a simple schematic view of an exemplary network environment 200, FIG. 3 illustrates a more detailed schematic view of a network environment 300 having various network components that are relevant to certain embodiments of the present invention. However, network environment 300 is but one example of a suitable network environment and is not intended to suggest any limitation as to the scope of use or functionality of the invention. Neither should the network environment be interpreted as having any dependency or requirement relating to any one or combination of components illustrated. Furthermore, the components discussed below may carry out additional functions besides those described.

FIG. 3 illustrates a number of components that might be included in an LTE network, such as LTE network 214, and a legacy network, such as legacy network 216. The components that might be included in the LTE network are separated from the components that might be included in the legacy network by a dashed line. Radio tower 312 in the LTE network includes an eNodeB, which, as described above, is the hardware component of the LTE network that communicates with mobile devices. Besides being in communication with mobile devices, the eNodeB is also in communication with other network components, such as the Mobility Management Entity (MME) 320 and the Serving Gateway (SGW) 314. MME 320 is a control node in the LTE network, and it is responsible for, among other things, tracking and paging procedures for mobile devices, as well as authenticating and authorizing mobile devices. Additionally, as discussed in greater detail below, MME 320 coordinates handovers between the LTE network and the legacy network. The Serving Gateway (SGW) 314 and Packet Data Network Gateway (PGW) 316 of the LTE network are responsible for routing user traffic. The IP Multimedia Subsystem (IMS) 318 provides IP-based telephony services for the LTE network. Thus, if mobile device 310 and mobile device 330 are VoLTE devices and are within the LTE network coverage area, then when mobile device 310 places an outgoing voice call to mobile device 330, the voice call takes place through IMS 318.

Continuing on with respect to FIG. 3, a number of components that may be included in the legacy network are illustrated. Radio tower 328 in the legacy network, which may include a Base Transceiver Station (BTS) 328, as well as other components, communicates with mobile devices and other components of the legacy network. Mobile Switching Center (MSC) 326 provides voice and other circuit-switched services to mobile devices. These circuit-switched services are provided through radio tower 328 if the mobile device is in the legacy network and not in the LTE network, or through radio tower 312 (which includes an eNodeB) via Inter-Working Solution (IWS) 324 if the mobile device is in the LTE network coverage area. In this way, IWS 324 acts as a bridge between the MSC, which provides circuit-switched services, and the LTE network, which provides packet-based services. The s102 interface 322 between IWS 324 and MME 320 relays signaling messages between the two components. This s102 interface is relevant to network handovers, as explained in greater detail below.

In FIG. 3, two mobile devices are depicted. Specifically, mobile device 310 and mobile device 330 are both within the LTE network coverage area. The LTE network coverage area may overlap with a legacy network coverage area, such that when the two mobile devices are in the LTE network coverage area, they may also be able to communicate with components of the legacy network. In one embodiment, mobile device 310 is a VoLTE device associated with an SRVCC capability type and mobile device 330 is associated with a CSFB capability type. As previously explained, if mobile device 310 is engaged in a voice call on the LTE network and begins moving out of the LTE network coverage area, then mobile device 310 utilizes its SRVCC capability in order to be handed over to a legacy network such that the voice call is seamlessly transferred from the LTE network to the legacy network. This handover is coordinated by MME 320 through s102 interface 322. If mobile device 330 is to be engaged in a voice call, either by making or receiving the call, then mobile device 330 is handed over from the LTE network to the legacy network for voice services, because, as previously described, mobile device 330 may not have voice capability on the LTE network. Again, this handover is coordinated by MME 320 through s102 interface 322.

As explained above, the handover of mobile device 310, which is associated with an SRVCC capability type, is to be completed quickly to avoid dropping the voice call that is in progress. In some embodiments, the handover is completed within about 200 milliseconds to about 250 milliseconds. The latency for the handover of mobile device 330, which is associated with a CSFB capability type, has a less significant impact on the quality of user experience than does the latency for the handover of mobile device 310, because the latency for the handover of mobile device 330 affects the time required to make an outgoing call or receive an incoming call, but does not create a risk of dropping a call that is already in progress, as does the latency for the handover of mobile device 310. Because the handovers of both mobile device 310 and mobile device 330 are performed through the s102 interface, if MME 320 receives multiple indications that multiple devices are to be handed over, the s102 interface tunnel traffic increases and the latency for network handovers increases. Specifically, if MME 320 does not differentiate between mobile device 310, for which latency has a significant impact on the quality of user experience, and mobile device 330, for which latency has a less significant impact on the quality of user experience, and simply performs the handovers in the order in which the handover indications were received, without regard to the capability type associated with each mobile device, then there is no way to ensure that the latency for the handover of mobile device 310 is within an acceptable range for a good user experience. Thus, the present invention provides for prioritizing the handovers of a mobile device based, in part, on the capability type associated with the mobile device, such that the latency for the handover of a mobile device having been assigned a high priority is minimized.

Figure 4B:
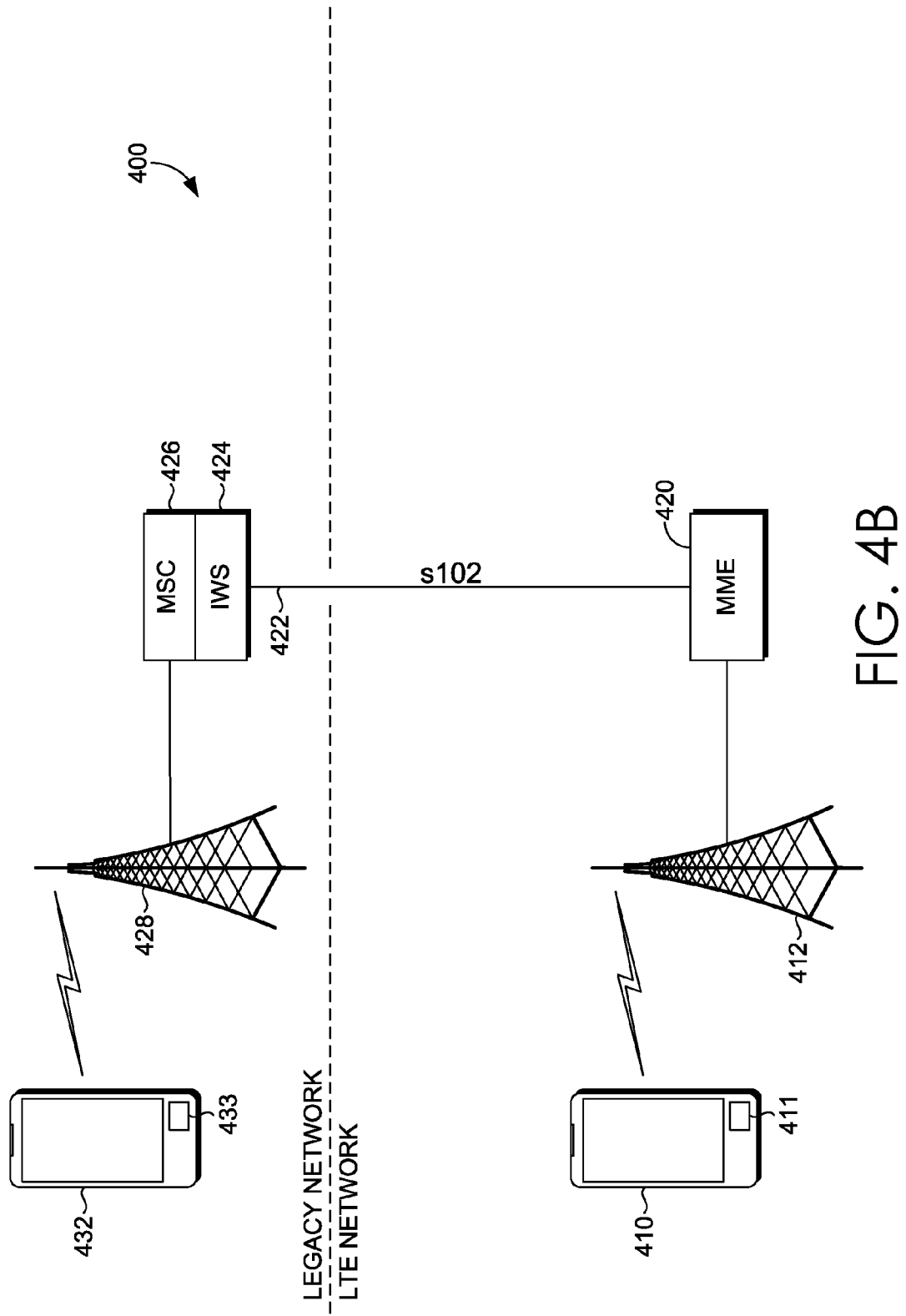
FIG. 4B is a schematic view of an exemplary scenario in which embodiments of the present invention may be implemented.

Turning now to FIGS. 4A and 4B, exemplary scenarios in which embodiments of the present invention may be employed are illustrated. Generally, FIGS. 4A and 4B illustrate an LTE network and a legacy network, as illustrated in FIG. 3, but, for the sake of simplicity, FIGS. 4A and 4B omit certain network components that are included in FIG. 3. The components that are illustrated in FIGS. 4A and 4B have functions and responsibilities that are similar to the functions and responsibilities of the components described with respect to FIG. 3.

In one embodiment illustrated by FIG. 4A, mobile device 410 is associated with an SRVCC capability type, and mobile device 430 is associated with a CSFB capability type. The MME 420 receives a message from each device including the capability type associated with the device. Specifically, logic 411 enables mobile device 410 to communicate its capability type to MME 420, and logic 431 enables mobile device 430 to communicate its capability type to MME 420. In response to receiving these messages, MME 420 assigns a priority to each of the mobile devices. The priority is based, at least in part, on the capability type associated with each device, as well as prioritization logic included in MME 420. At some later point in time, MME 420 may receive indications that both mobile device 410 and mobile device 430 are to be handed over from the LTE network to the legacy network. As discussed above, mobile device 410 may be handed over from the LTE network to the legacy network if mobile device 410 is engaged in a voice call on the LTE network and begins to move out of the LTE network coverage area. Mobile device 430 may be handed over from the LTE network to the legacy network in order to make or receive a voice call. In response to receiving the indications that both mobile device 410 and mobile device 430 are to be handed over, MME 420 prioritizes the handover of each mobile device according to its assigned priority. In one embodiment, for example, mobile device 410 is assigned a priority that is higher than the priority assigned to mobile device 430, so the handover of mobile device 410 is prioritized over the handover of mobile device 430. Accordingly, the handover of mobile device 410 occurs prior to the handover of mobile device 430. In this way, the ongoing call in which mobile device 410 is engaged may be transferred seamlessly to the legacy network, such that the call is not dropped.

In another embodiment illustrated in FIG. 4A, mobile device 410 sends a message to MME 420 indicating that mobile device 410 is associated with an SRVCC capability type. Mobile device 410 places an outgoing call to a receiving mobile device 430. Mobile device 410 and receiving mobile device 430 are both located in the LTE network coverage area. When mobile device 410 begins to move out of the LTE network coverage area, the mobile device 410 must be handed over from the LTE network to the legacy network. MME 420 prioritizes the handover of mobile device 410 in accordance with the priority assigned to mobile device 410, the assignment of which is based, in part, on the SRVCC capability type associated with mobile device 410. Thus, if MME 420 receives multiple indications that multiple devices are to be handed over from the LTE network to the legacy network for voice services, the MME 420 prioritizes the handover of mobile device 410 such that the handover of mobile device 410 occurs prior to the handover of other mobile devices that are associated with a non-SRVCC capability type and assigned a lower priority. In this way, the ongoing call between mobile device 410 and receiving mobile device 430 is seamlessly transferred to the legacy network, such that the call is not dropped.

FIG. 4B is similar to FIG. 4A, but in FIG. 4B, mobile device 432 is located in the legacy network coverage area. Mobile device 432 includes logic 433 that enables mobile device 432 to communicate its capability type to MME 420 when mobile device 432 is in the LTE network coverage area. In one embodiment, mobile device 410 is associated with an SRVCC capability type. Mobile device 410 communicates this capability type to MME 420 when mobile device 410 initially attaches to the LTE network. Then, mobile device 410 places an outgoing call to receiving mobile device 432. As discussed above, when mobile device 410 begins to move out of the LTE network coverage area, the mobile device 410 must be handed over from the LTE network to the legacy network. MME 420 prioritizes the handover of mobile device 410 in accordance with the priority assigned to mobile device 410 based, in part, on its SRVCC capability type. Thus, if MME 420 receives multiple indications that multiple devices are to be handed over from the LTE network to the legacy network for voice services, the MME 420 prioritizes the handover of mobile device 410 such that the handover of mobile device 410 occurs prior to the handover of other mobile devices that are associated with a non-SRVCC capability type and assigned a lower priority. In this way, the ongoing call between mobile device 410 and receiving mobile device 432 is seamlessly transferred to the legacy network, such that the call is not dropped.

FIGS. 4A and 4B thus demonstrate the applicability of the present invention to mobile devices located in multiple networks. Specifically, a user of a mobile device associated with an SRVCC capability type benefits from the present invention when the user is engaged in a voice call on the LTE network and subsequently moves out of the LTE network coverage area. This is true regardless of where the receiving mobile device is located.

The above discussion regarding FIGS. 4A and 4B describes communicating a capability type associated with a mobile device to MME 420. It should also be noted that the capability type may be communicated to a number of core network components, such as those illustrated in FIG. 3, including MME 320, PGW 316, IMS 318, MSC 326, and IWS 324. When the device capability type is known by core network components such as these, congestion within the network may be alleviated through prioritization based on device capability type.

The present invention may also be used to prioritize the handover of a mobile device engaged in any packet-switched services on the LTE network to the legacy network. For example, if a mobile device is engaged in a video call on an LTE network, and the mobile device subsequently moves out of the LTE network coverage area, the present invention may be used to prioritize the handover of that mobile device and convert the video call on the LTE network to a voice call on the legacy network.

To reduce the latency for the handover of mobile devices for which minimal latency is particularly desirable, the present invention provides a method for prioritizing handovers from the LTE network to the legacy network. FIG. 5 illustrates a number of steps that may be used to implement this method. At block 510, a message including a capability type associated with a mobile device, such as mobile device 410 of FIG. 4A, is received at a management component, such as MME 420 of FIG. 4A. In one embodiment, the capability type indicates whether the mobile device is capable of utilizing voice services on the LTE network. For example, the MME might receive a message that the mobile device is associated with an SRVCC capability type. The mobile device may include logic, such as logic 411 of FIG. 4A, that enables the mobile device to communicate its capability type to the MME. In one embodiment, the message including the capability type associated with the mobile device is a new message. In another embodiment, the capability type associated with the mobile device is added to an existing message. The existing message may be one of the initial messages sent by the mobile device when it seeks to attach to the LTE network. This message may be sent from the mobile device to a control component, such as the eNodeB included in radio tower 412 of FIG. 4A, and then on to the MME. This message may also be sent to a number of core network components, such as MME 320, PGW 316, IMS 318, MSC 326, and IWS 324 of FIG. 3.

At block 512, a priority is assigned to the mobile device based on prioritization logic and the capability type associated with the mobile device. For example, a priority is assigned to the mobile device, and the assigned priority is based, in part, on the SRVCC capability type associated with the mobile device. If the mobile device later moves out of the LTE network coverage area, it will be handed over from the LTE network to the legacy network, and if at that later time, the mobile device is engaged in a voice call on the LTE network, the handover is to be completed quickly to avoid dropping the call when the call is transferred to the legacy network. In some embodiments, the handover is completed within about 200 milliseconds to about 250 milliseconds. Thus, at block 514, the handover from the LTE network to the legacy network is prioritized according to the priority assigned to the mobile device. If the mobile device has been assigned a high priority, then its handover will be prioritized over the handover of other devices that have been assigned a lower priority. In this way, the latency for the handover of a mobile device having been assigned a high priority is reduced and the user of such a mobile device enjoys a good user experience, even when s102 interface tunnel traffic is heavy.

In some embodiments, prioritizing the handover may further involve initiating a handover of a first device having been assigned a first priority before initiating a second handover of a second device having been assigned a second priority. For example, if a first device associated with an SRVCC capability type is assigned a first priority, and a second device associated with a CSFB capability type is assigned a second, lower priority, then the first device associated with an SRVCC capability type will be handed over before the second device associated with a CSFB capability type.

In another embodiment, a first mobile device, which is associated with an SRVCC capability type, is engaged in a voice call on the LTE network with a second mobile device. A third mobile device capable of communicating with the LTE network sends a message to a management component that the third mobile device is associated with a CSFB capability type. The management component receives an indication that the first mobile device is to be handed over at about the same time that the management component receives an indication that the third mobile device is to be handed over. The management component assigns a first priority to the first mobile device, and that first priority is higher than a second priority that the management component assigns to the third mobile device. Accordingly, the management component initiates a handover of the first mobile device before initiating a handover of the third mobile device.

Turning now to FIG. 6, a series of steps for prioritizing the handover of one mobile device over another mobile device, in accordance with one embodiment of the present invention, is illustrated. At block 610, a first message including a first capability type associated with a first mobile device, such as mobile device 410 of FIG. 4A, is received at a management component, such as MME 420 of FIG. 4A. A second message including a second capability type associated with a second mobile device, such as mobile device 430 of FIG. 4A, is received at the MME at block 612. For example, the MME might receive a first message that the first mobile device is associated with an SRVCC capability type and a second message that the second mobile device is associated with a CSFB capability type. The first and second mobile devices may include logic, such as logic 411 and logic 431 of FIG. 4A, respectively, that enable the mobile devices to communicate their capability types to the MME.

Based on prioritization logic and the capability types of the two devices, at block 614, it is determined that a first device handover of the first mobile device is to occur prior to a second device handover of the second mobile device. At block 616, the first device handover of the first mobile device is prioritized such that the first device handover of the first mobile device occurs prior to the second device handover of the second mobile device. For example, the MME might receive multiple indications, all received at about the same time, both the first and second mobile device are to be handed over to the legacy network for voice services. The MME determines that the handover of the first mobile device is to occur prior to the handover of the second mobile device. Then, according to this determination, the handover of the first mobile device is prioritized such that the handover of the first mobile device does occur prior to the handover of the second mobile device. This prioritization is in accordance with the exemplary prioritization scheme illustrated in FIG. 7, which shows a first priority assigned to devices associated with an SRVCC capability type, a second priority assigned to devices associated with a CSFB capability type, and a third priority assigned to legacy devices, such as a legacy LTE device utilizing internet services, for which the latency for network handovers does not significantly impact the quality of user experience. This prioritization scheme ensures that when multiple devices are to be handed over from the LTE network to the legacy network for voice services, the devices associated with an SRVCC capability type are handed over first, such that ongoing voice calls are not dropped, the devices associated with a CSFB capability type are handed over second, and the devices associated with a legacy capability type are handed over last.

It will be understood by those of ordinary skill in the art that the order of steps shown in the method 500 of FIG. 5 and method 600 of FIG. 6 is not meant to limit the scope of the present invention in any way and, in fact, the steps may occur in a variety of different sequences within embodiments hereof. Any and all such variations, and any combination thereof, are contemplated to be within the scope of embodiments of the present invention.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A method for prioritizing a handover of a first mobile device from an LTE network to a legacy network, the method comprising:
   at a network management component, receiving a message from the first mobile device, the message indicating that the first mobile device is associated with a Single Radio Voice Call Continuity (SRVCC) capability type;
   assigning a first priority to the first mobile device based on prioritization logic and the SRVCC capability type associated with the first mobile device, wherein the first priority is higher than a second priority assigned to a second mobile device associated with a Circuit Switched Fall Back (CSFB) capability type; and
   prioritizing the handover of the first mobile device from the LTE network to the legacy network according to the first priority assigned to the first mobile device.

2. The method of claim 1, wherein the message indicating that the first mobile device is associated with the SRVCC capability type is a new message.

3. The method of claim 1, wherein the message indicating that the first mobile device is associated with the SRVCC capability type is added to an existing message.

4. The method of claim 1, wherein the message indicates whether the first mobile device is capable of utilizing voice services on the LTE network.

5. The method of claim 1, wherein prioritizing the handover comprises initiating a first device handover of the first mobile device having been assigned the first priority before initiating a second device handover of the second mobile device having been assigned the second priority.

6. The method of claim 5, wherein the first mobile device is engaged in a voice call on the LTE network when the first device handover occurs.

7. Non-transitory computer-readable media having computer-executable instructions embodied thereon that, when executed, perform a method for prioritizing a handover of a first mobile device from an LTE network to a legacy network, the method comprising:
  at a network management component, receiving a first message from the first mobile device, the first message indicating a first capability type associated with the first mobile device, the first capability type comprising a Single Radio Voice Call Continuity (SRVCC) capability type;
  receiving a second message from a second mobile device, the second message indicating a second capability type associated with the second mobile device, the second capability type comprising a Circuit Switched Fall Back (CSFB) capability type;
  utilizing prioritization logic, the first capability type, and the second capability type to determine that a first device handover of the first mobile device from the LTE network to the legacy network is to occur prior to a second device handover of the second mobile device from the LTE network to the legacy network; and
  prioritizing the first device handover of the first mobile device such that the first device handover of the first mobile device occurs prior to the second device handover of the second mobile device.

8. The computer-readable media of claim 7, further comprising, at the network management component, receiving a first indication and a second indication at about the same time, the first indication indicating that the first mobile device is to be handed over and the second indication indicating that the second mobile device is to be handed over.

9. The computer-readable media of claim 8, wherein the first mobile device is engaged in a voice call on the LTE network when the handover occurs.

10. The computer-readable media of claim 7, wherein prioritization logic provides for assigning a first priority based on the SRVCC capability type, a second priority based on the CSFB capability type, and a third priority based on a legacy capability type, wherein the first priority is higher than the second priority, and the second priority is higher than the third priority.

11. The computer-readable media of claim 7, wherein the first message is added to an existing message for initiating communication with the LTE network.

12. A system for prioritizing handovers from an LTE network to a legacy network, the system comprising:
  a network management component that:
    receives a first message indicating a capability type associated with a first mobile device,
    assigns a first priority to the first mobile device based on prioritization logic and the capability type associated with the first mobile device, wherein the prioritization logic provides for assigning a higher priority based on a Single Radio Voice Call Continuity (SRVCC) capability type and for assigning a lower priority based on a Circuit Switched Fall Back (CSFB) capability type, and
    prioritizes a first device handover of the first mobile device from the LTE network to the legacy network according to the first priority assigned to the first mobile device.

13. The system of claim 12, wherein the first message indicating the capability type associated with the first mobile device is sent to the network management component through a control component.

14. The system of claim 12, wherein the first message indicating the capability type associated with the first mobile device is a new message.

15. The system of claim 12, wherein the first message indicating the capability type associated with the first mobile device is added to an existing message for initiating communication with the LTE network.

16. The system of claim 12, wherein prioritizing the first device handover comprises initiating a handover of a device that is assigned the higher priority before initiating a handover of a device that is assigned the lower priority.

17. The system of claim 12, further comprising:
  the first mobile device, wherein the first mobile device includes logic that enables the first mobile device to send the first message, the first message indicating that the first mobile device is associated with the SRVCC capability type.

18. The system of claim 17, further comprising:
  a second mobile device capable of communicating with the LTE network, the second mobile device including logic that enables the second mobile device to send a second message, the second message indicating that the second mobile device is associated with the CSFB capability type; and
  wherein the network management component further:
    receives a first indication and a second indication at about the same time, the first indication indicating that the first mobile device is to be handed over and the second indication indicating that the second mobile device is to be handed over,
    assigns a second priority to the second mobile device, the second priority being lower than the first priority assigned to the first mobile device, and
    initiates the first device handover of the first mobile device before initiating a second device handover of the second mobile device.

19. The system of claim 18, wherein prioritizing the first device handover causes the first device handover of the first mobile device associated with the SRVCC capability type to be completed within about 200 milliseconds to about 250 milliseconds.

20. The system of claim 17, wherein the network management component assigns the first priority to the first mobile device based on the SRVCC capability type, the first priority being higher than a second priority assigned to a second mobile device associated with the CSFB capability type.

* * * * *